C. S. COMINS.
Glue-Pot.
No. 219,388. Patented Sept. 9, 1879.
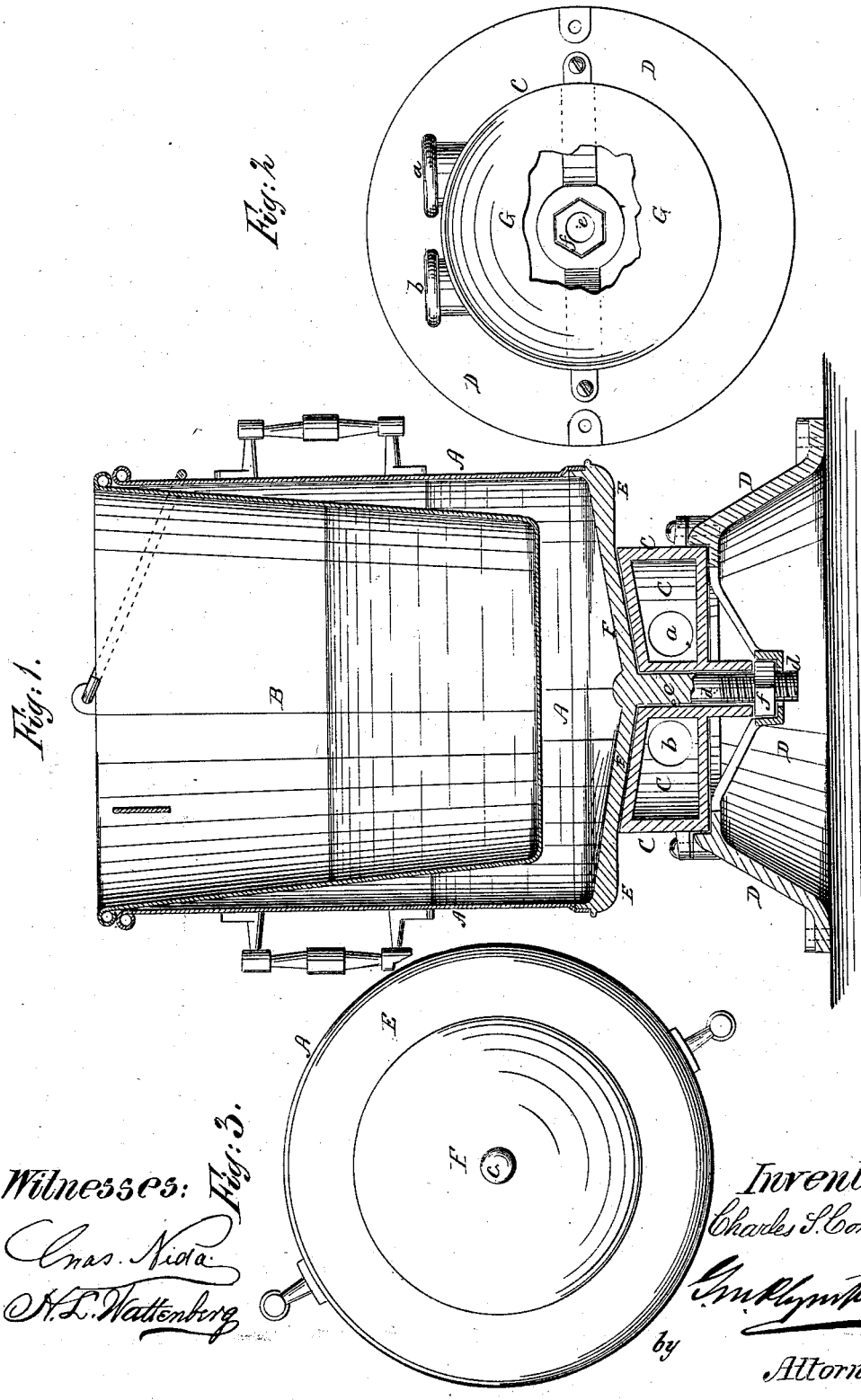
Witnesses:
Chas. Nida
N. L. Wattenberg
Inventor:
Charles S. Comins
by
Attorney.

UNITED STATES PATENT OFFICE.

CHARLES S. COMINS, OF BOSTON, MASSACHUSETTS.

IMPROVEMENT IN GLUE-POTS.

Specification forming part of Letters Patent No. 219,388, dated September 9, 1879; application filed February 21, 1879.

*To all whom it may concern:*

Be it known that I, CHARLES S. COMINS, of Boston, in the county of Suffolk and State of Massachusetts, have invented a new and Improved Glue-Pot; and that the following is a full, clear, and exact description of the same, reference being had to the accompanying drawings, and to the letters of reference marked thereon, making part of this specification.

This invention is in the nature of an improvement in glue-pots; and the invention consists more particularly in an improvement in the glue-pot described and shown in the patent granted to me on the 11th day of January, 1876, and numbered 171,922, the improvement consisting in a glue-pot constructed with a convex bottom fitting air-tight into a convex base or seat when the one is received within the other.

In the accompanying sheet of drawings, Figure 1 is a vertical section of my improved glue-pot; Fig. 2, a plan or top view of the heating-base, partly in section, showing concavity in its upper surface; and Fig. 3, a plan or top view of under side of the glue-pot, showing convex portion.

Similar letters of reference indicate like parts in the several figures.

My glue-pot consists, substantially, of a vessel, A, to contain the water; a receptacle, B, to contain the glue; and a heating-base, C, into which is admitted the steam through the inlet-opening *a* for the purposes of heating the glue, the whole being supported by a suitable foundation, as D. The bottom E of the vessel A is formed with a convex part, F, projecting downward from the bottom E, as shown in Fig. 1, this convex part F having a spindle, *c*, projecting from its apex, with a screw-thread, *d*, cut upon its end. The heating-base C has formed in its upper surface a concavity, G, which concavity corresponds with the convex projection F of the vessel A, the spindle *c* passing through an opening, *e*, in the center of the concavity, and the screw-thread *d* entering into screw-threads formed in a separate nut, *f*, secured at the lower part of the opening *e*.

The surfaces of the convex part or portion F and the concavity G are carefully ground together, so that the one part accurately fits within the other air-tight, in substantially the same manner as does a conical valve within its seat, the convex part F practically forming a valve, and the concavity G a seat for the valve.

Now, when the glue-pot is ready for use, the convex part F is received within the concavity G, the spindle *c* within the opening *e*, and the screw-threads *d* within the screw-threads of the nut *f*, and the convex and concave portions F and G in contact and fitting together air-tight. Steam being then admitted through the inlet-openings *a*, circulating beneath the concave portion G and out of the outlet-opening *b*, heat is imparted to the water within the vessel A, which is soon caused to boil, and the glue within the receptacle B melted and ready for use.

As long as the convex and concave surfaces are closely in contact the water in the vessel A will continue to boil; but since it is only desirable that the glue in the receptacle B should remain in a hot melted state, and the water in the vessel A kept hot without boiling over, this result is accomplished by turning the vessel A slightly, which will cause the convex surface F to be raised more or less above the concavity G by the unscrewing of the threads *d* of the spindle *c*. As soon as a space is formed between the convex and concave surfaces F and G a stratum of air is admitted between them, which, acting as a non-conductor, protects the convex surface F from the action of the heat, and the more the vessel A is turned the more will the concave part F be raised from the concavity G, and the more air will be admitted between those two surfaces, and the less the water in the vessel A will be heated, and the less will the glue be melted So accurately is this found to work in practice that the very least turn of the vessel A will check the boiling of the water within it, and in this way the glue may be kept at any temperature desired, and the water in the vessel be prevented from boiling over. The adjustment once being made, no further care need be given to its working.

It is obvious that the convex surface may be formed on the base C and the concavity in the bottom of the vessel A, which will produce the same result.

I do not claim the adjustable features of this glue-pot, since such have already been patented to me in my patent of January 11, 1876, before referred to; but What I do claim as new, and desire to secure by Letters Patent, is—

An adjustable glue-pot constructed with a convex base, in combination with a concave seat for such base, the convex and concave surfaces being fitted together accurately and air-tight, and forming substantially an air-valve, as shown and described.

CHARLES S. COMINS.

Witnesses:
 F. C. HENEY,
 THOS. B. COMINS, Jr.,
 CHAS. HALL ADAMS.